(12) United States Patent
Hall et al.

(10) Patent No.: US 10,728,052 B2
(45) Date of Patent: Jul. 28, 2020

(54) SECURE REMOTE ACTUATION SYSTEM

(71) Applicant: David R. Hall, Provo, UT (US)

(72) Inventors: David R. Hall, Provo, UT (US); Mark Hall, Provo, UT (US); Craig Boswell, Provo, UT (US)

(73) Assignee: Hall Labs LLC, Provo, UT (US)

( * ) Notice: Subject to any disclaimer, the term of this patent is extended or adjusted under 35 U.S.C. 154(b) by 289 days.

(21) Appl. No.: 15/981,476

(22) Filed: May 16, 2018

(65) Prior Publication Data

US 2018/0262361 A1    Sep. 13, 2018

Related U.S. Application Data

(63) Continuation-in-part of application No. 14/461,128, filed on Aug. 15, 2014, now abandoned, which is a
(Continued)

(51) Int. Cl.
*H04L 12/28* (2006.01)
*G08C 17/02* (2006.01)
(Continued)

(52) U.S. Cl.
CPC .......... *H04L 12/2818* (2013.01); *G08C 17/02* (2013.01); *H01H 35/02* (2013.01);
(Continued)

(58) Field of Classification Search
CPC . H04L 12/2818; G08C 17/02; G08C 2201/92; H01H 35/02; H01H 25/041
(Continued)

(56) References Cited

U.S. PATENT DOCUMENTS 8,331,544 B2 * 12/2012 Kraus ................ H04L 12/2818
                                                    379/127.01
8,538,341 B2 *  9/2013 Rousseau ............... G08C 17/02
                                                    455/127.1
(Continued)

*Primary Examiner* — Vernal U Brown

(57) ABSTRACT

There is disclosed a secure remote actuation system that includes a network storing one or more acceptable inputs. The system also includes a central signal switch disposed inside an enclosure. The central signal switch stores therein the one or more acceptable inputs and user codes, which comprise a succession of the acceptable inputs. The system further includes a remote input receptor that, in turn, includes a user interface with a communication tilt plate that has a front side and a back side. The front side includes an outer touch surface. The back side includes electronic components mounted thereon, a raised center pivot and a plurality of spring loaded switches mounted thereon disposed around the periphery of the back side. As such, tilting the communication tilt plate by pressing proximate the periphery of the outer touch surface will activate two or more of the spring-loaded switches mounted on the back side of the tilt plate, thereby transmitting the one or more user codes. The system also includes a microcontroller for obtaining and comparing said one or more acceptable inputs to said one or more user codes. The system also includes a web application for receiving the one or more acceptable inputs and the user codes for a user. The web application is in electronic communication with the microcontroller and communicates information pertaining to recent user interactions with the secure remote actuation system to the user through the remote input receptor. The microcontroller obtains the one or more acceptable inputs from the network after the user begins to use the interface.

20 Claims, 7 Drawing Sheets

Related U.S. Application Data continuation-in-part of application No. 14/323,549, filed on Jul. 3, 2014, now Pat. No. 9,712,335, and a continuation-in-part of application No. 14/323,618, filed on Jul. 3, 2014, now Pat. No. 9,967,151.

(51) Int. Cl.
  *H01H 35/02* (2006.01)
  *H04W 12/00* (2009.01)
  *H01H 25/04* (2006.01)

(52) U.S. Cl.
  CPC ..... *G08C 2201/60* (2013.01); *G08C 2201/92* (2013.01); *H01H 25/041* (2013.01); *H01H 2300/03* (2013.01); *H04W 12/00503* (2019.01)

(58) Field of Classification Search
  USPC ........................................................ 340/5.2
  See application file for complete search history.

(56) References Cited

U.S. PATENT DOCUMENTS

| | | | |
|---|---|---|---|
| 2002/0014954 A1* | 2/2002 | Fitzgibbon | G07C 9/00182 340/5.64 |
| 2006/0168618 A1* | 7/2006 | Choi | H04L 12/2818 725/37 |

\* cited by examiner

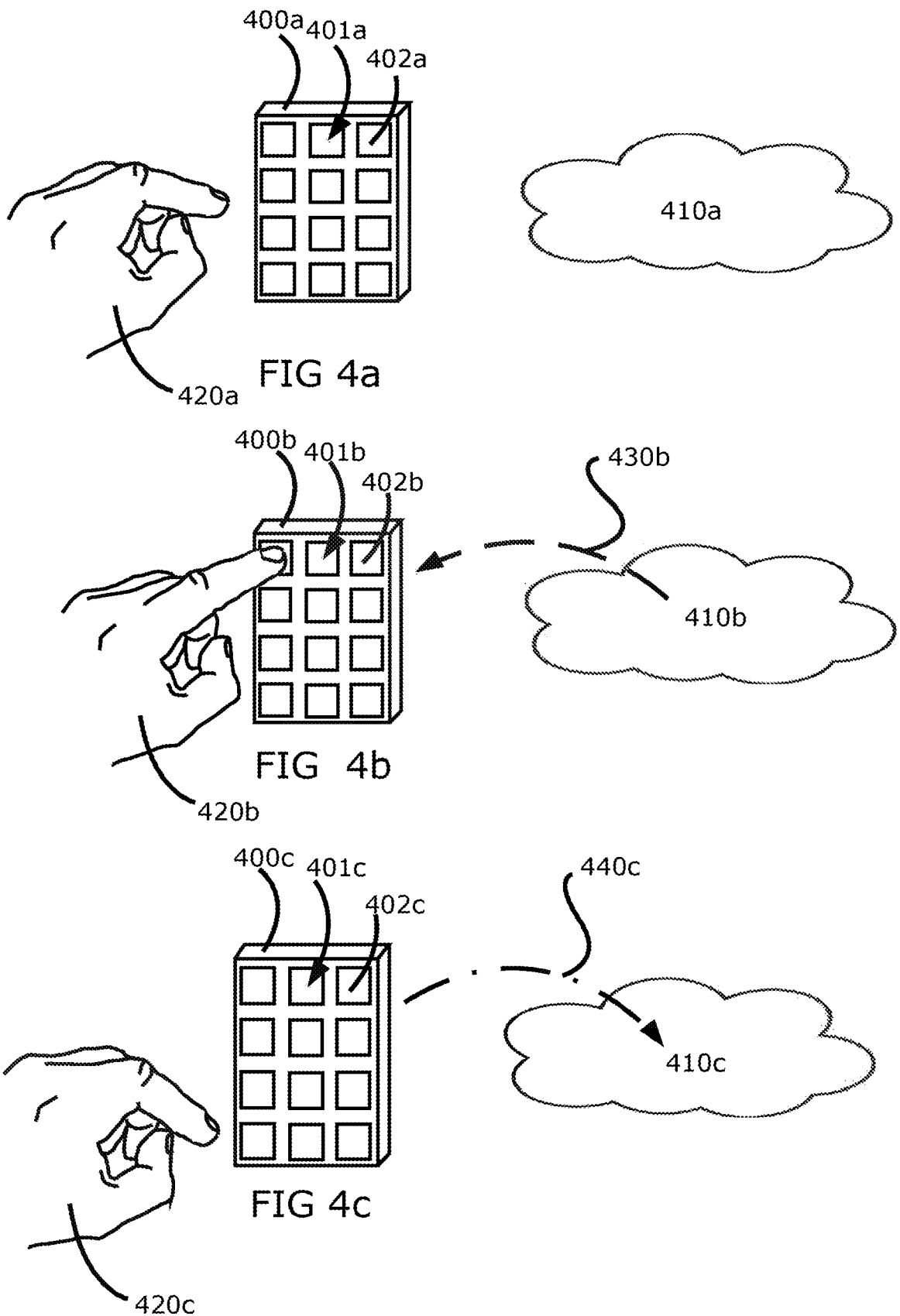

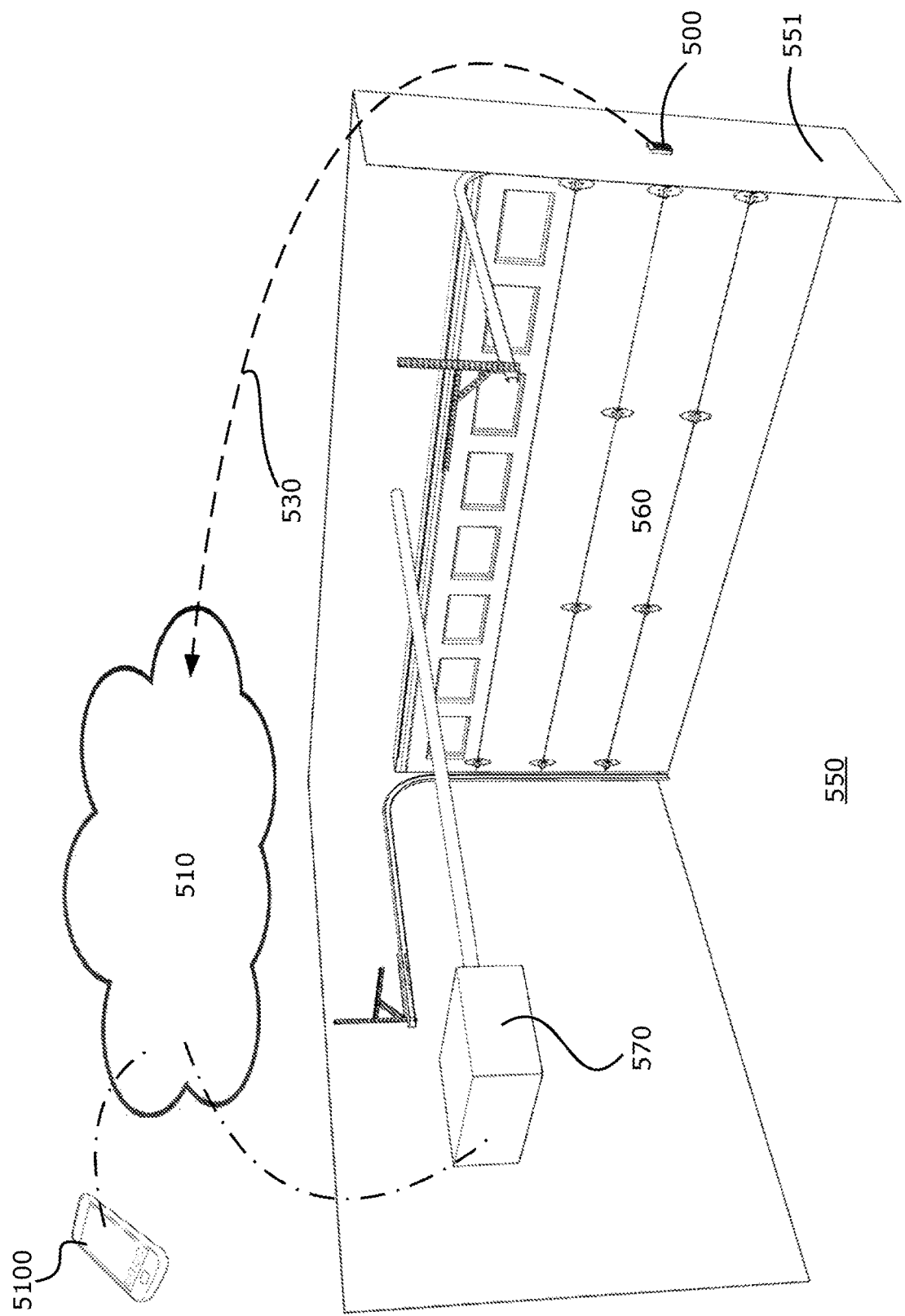

SECURE REMOTE ACTUATION SYSTEM

CROSS-REFERENCE TO RELATED APPLICATIONS

This application is a continuation-in-part of U.S. patent application Ser. No. 14/461,128, filed on Aug. 15, 2014, entitled "Secure Remote Actuation System," which is a continuation-in-part of U.S. patent Ser. No. 14/323,549, filed on Jul. 3, 2014, and entitled "Secure Remote Actuation System" and U.S. patent Ser. No. 14/323,618, filed on Jul. 3, 2014, and also entitled "Secure Remote Actuation System" which are incorporated by reference herein for all that they contain.

BACKGROUND

The present invention relates generally to remote actuation systems comprising devices capable of performing remote operations. Examples of typical remote actuation systems include thermostats, which may control heating and cooling devices from a remote location, and garage door openers, which may provide remote access to secured areas. The remote portions of such devices commonly require a portable power source, such as a battery or photovoltaic cell. It is also typical of such devices to comprise communications means, such as a radio frequency transceiver, to receive and/or relay information.

For example, U.S. Pat. No. 8,331,544 to Kraus et al., which is incorporated herein for all that it discloses, describes a system that remotely operates a door lock. The door lock may be powered by a battery and be configured to send and receive radio frequency signals as part of a mesh network. In such a mesh network, each connected device acts as a communication node that can send and receive packets of information to any other device in the network. The door lock may further comprise a memory module where individual user codes are stored and a logic module to compare user codes to input codes at the door to allow access decisions to be made at the door without transmissions.

Such systems typically require continuing communications over a network that may cause rapid consumption of power. Thus, various attempts have been made to conserve power in such systems. For example, U.S. Pat. No. 4,614,945 to Brunius, et al., which is incorporated herein for all that it discloses, describes communicating information between a plurality of instrument monitoring units to a remotely located data collection unit. The monitoring units are radio frequency transponder circuits that are operatively connected to one or more instruments whose parameters are being monitored. The transponders continuously monitor one or more parameters of the instrument(s) with which they are associated. The transponders collect and accumulate parameter information and/or data from their associated instruments and continually listen for a "wake-up" signal from an interrogate receiver/data collection unit.

SUMMARY

In a first aspect, the invention is a secure remote actuation system that includes a network storing one or more acceptable inputs. The system also includes a central signal switch disposed inside an enclosure. The central signal switch stores therein the one or more acceptable inputs and user codes, which comprise a succession of the acceptable inputs. The system further includes a remote input receptor that, in turn, includes a user interface with a communication tilt plate that has a front side and a back side. The front side includes an outer touch surface. The back side includes electronic components mounted thereon, a raised center pivot and a plurality of spring loaded switches mounted thereon disposed around the periphery of the back side. As such, tilting the communication tilt plate by pressing proximate the periphery of the outer touch surface will activate two or more of the spring-loaded switches mounted on the back side of the tilt plate, thereby transmitting the one or more user codes. The system also includes a microcontroller for obtaining and comparing said one or more acceptable inputs to said one or more user codes. The system also includes a web application for receiving the one or more acceptable inputs and the user codes for a user. The web application is in electronic communication with the microcontroller and communicates information pertaining to recent user interactions with the secure remote actuation system to the user through the remote input receptor. The microcontroller obtains the one or more acceptable inputs from the network after the user begins to use the interface.

The secure remote actuation system of the present invention may comprise a remote input receptor operably connected to a cloud-based network. Such a network may comprise a combination of computer systems interconnected by telecommunications equipment and/or cables allowing information to be exchanged. One or more acceptable inputs may be stored within the cloud-based network. The network may further comprise a central signal switch disposed inside an enclosure, wherein the central signal switch stores therein the one or more acceptable inputs comprising user codes comprising a succession of inputs. The remote input receptor may comprise a communication tilt plate comprising a front side and a back side, the front side comprising an outer touch surface and the back side comprising electronic components mounted thereon and the back side further comprising a raised center pivot and a plurality of spring loaded switches mounted thereon disposed around the periphery of the back side of the tilt plate such that by tilting the communication tilt plate by pressing proximate the periphery of the outer touch surface two or more of the spring loaded switches mounted on the back side of the tilt plate are activated to transmit the one or more user codes. The remote input receptor may comprise a user interface comprising the communication tilt plate for receiving the one or more user codes from a user. The remote input receptor may further comprise a microcontroller for obtaining and comparing the acceptable inputs to the user codes. In the present invention, the microcontroller obtains the one or more acceptable inputs from the cloud-based network after the user begins to transmit user codes using the user interface.

The remote input receptor may also comprise an internal memory unit. The internal memory unit may store acceptable inputs, user codes, a history of user codes, or various input parameters. The remote input receptor may additionally comprise at least one communication device, such as a radio frequency transceiver, for receiving the acceptable inputs. Such a radio frequency transceiver may be a universal device such that it is capable of communicating with a plurality of other devices by reciprocating various radio frequency transmissions. The remote input receptor may furthermore comprise a portable power source, such as a battery or solar panel.

The remote input receptor may be capable of executing a low power function after it compares the acceptable inputs to the user codes, wherein power is cut from unneeded subsystems and reduced in others until reactivated. The remote input receptor may exit the low power function when the user begins to use the user interface or when a surveillance device, forming part of the remote input receptor, detects a user. The surveillance device may comprise a camera, a microphone, a proximity sensor, or a combination thereof.

The user interface may comprise buttons, a visual display, capacitive sensors, a microphone, a vibration recognition module, a proximity sensor, a fingerprint scanner, a retina scanner, a voice recognition module, or a combination thereof as a means for receiving acceptable inputs from a user.

The remote input receptor may further comprise at least one data connection port. Such a data connection port may be disposed in an interior of the remote input receptor.

A software application may allow a user to control the acceptable inputs stored on the network. For example, a software application may allow the user to edit, add, or delete acceptable inputs from the network, change parameters, change personal settings, alter system firmware, and/or conduct diagnoses. The network may also store a history of acceptable inputs or input parameters.

The network may be operably connected to and control one or more actionable devices such as a thermostat, a television, an automated window, automated blinds, a ventilation system, a sprinkler system, a lighting element, an indoor positioning system, or an access control device.

The access control device may be an electromechanical locking mechanism or a garage door opener that may secure an enclosed area, room, building, or delivery box.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIGS. 4a, 4b, and 4c are perspective views of an embodiment of a portion of a user and a remote input receptor comprising a user interface and operably connected to a network.

FIG. 5 is a perspective view of elements of an embodiment of a remote secure actuation system associated with an enclosed area.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

Figure 1:
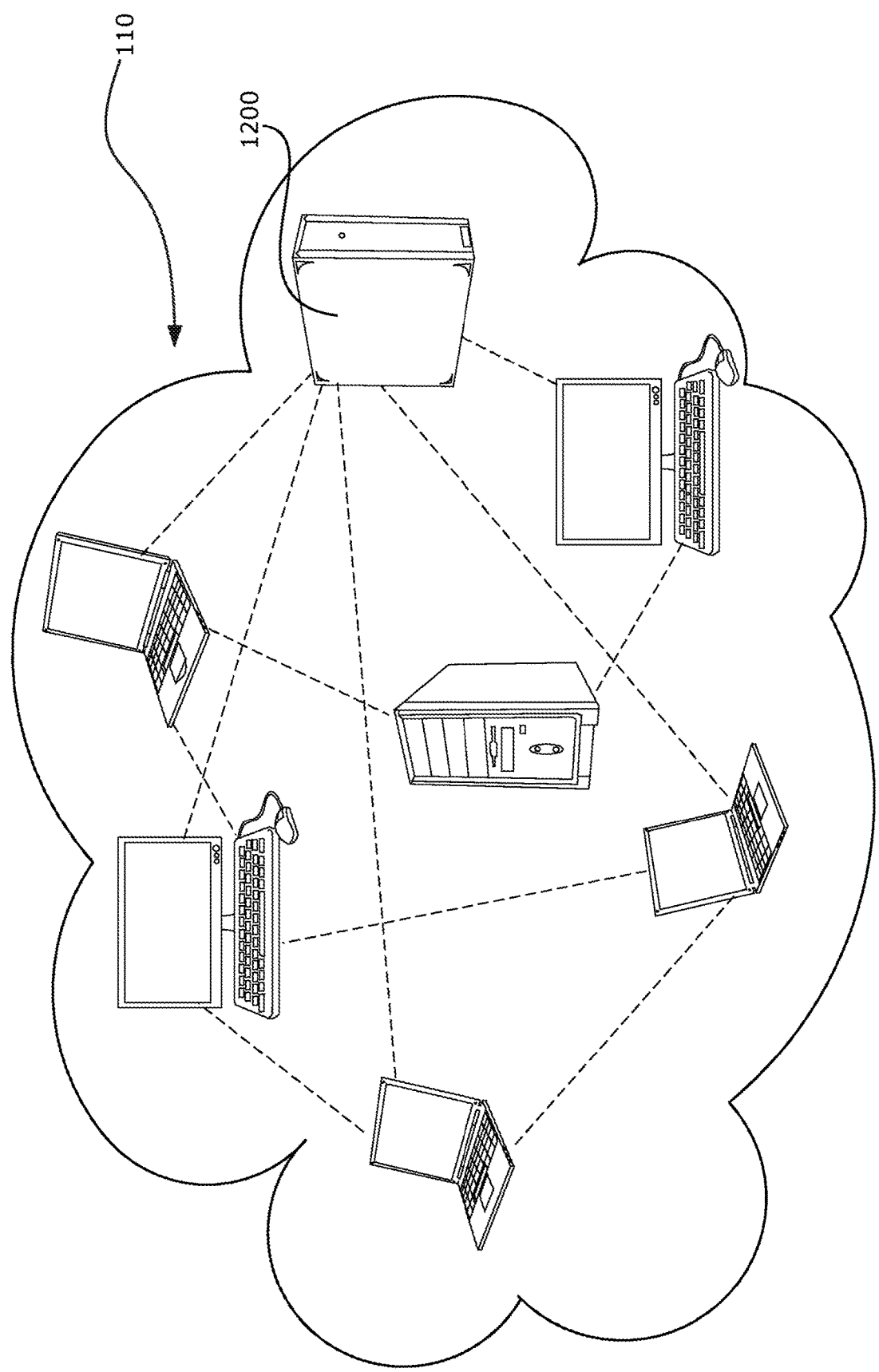
FIG. 1 is a schematic representation of an embodiment of a network device operably connected to a network.

FIG. 1 shows an embodiment of a network device 1200 forming a part of a network 110. The network 110 may comprise a combination of computer systems interconnected by telecommunications equipment or cables allowing information to be exchanged. In various embodiments, network devices may comprise a desktop or laptop computer, a cell phone, a computer server, or other devices capable of communicating on such a network.

Figure 2:
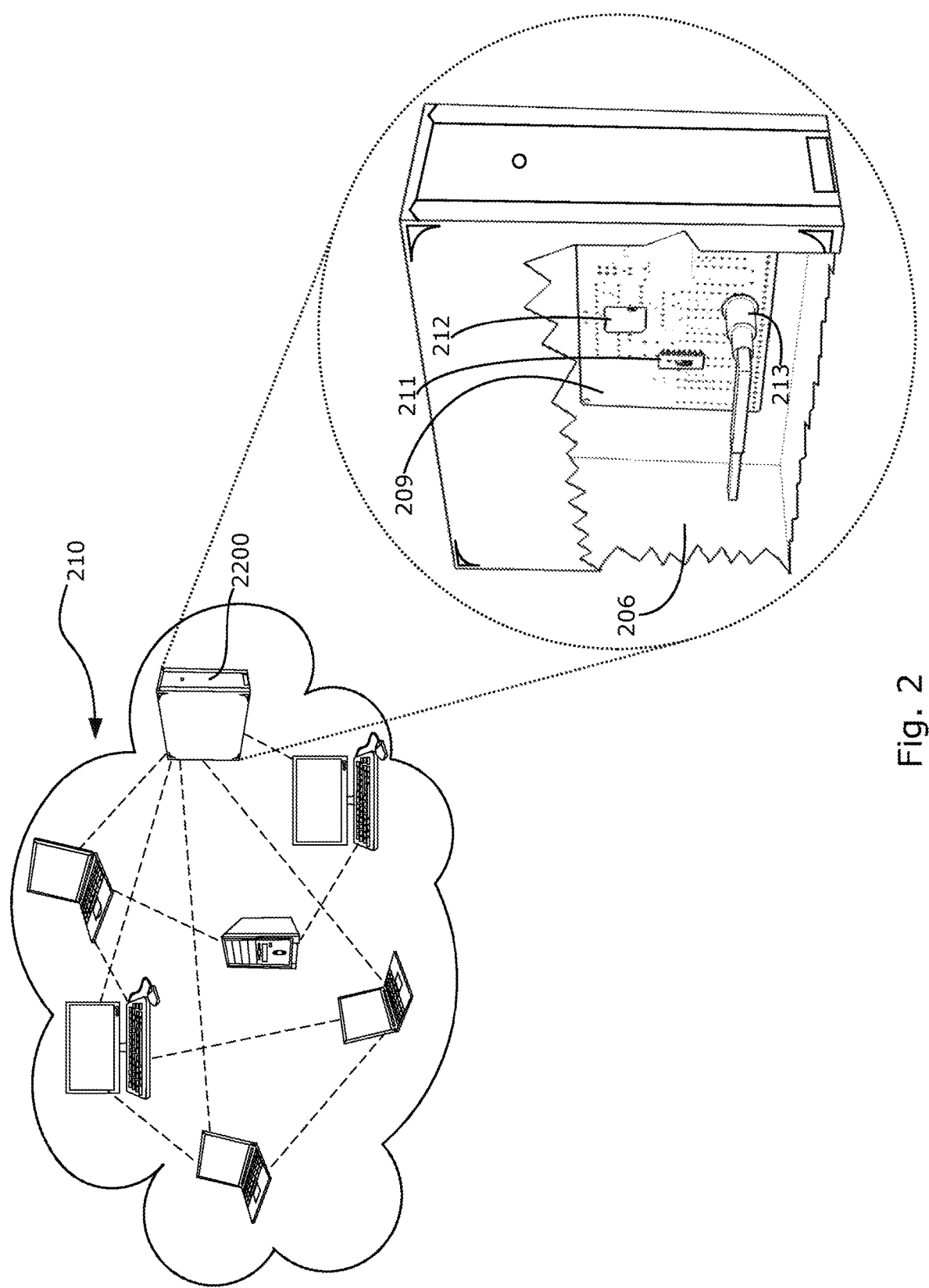
FIG. 2 is a partially cutaway perspective view of an embodiment of a network device forming part of a network, the network device comprising a plurality of components supported by a printed circuit board disposed therein.

FIG. 2 shows an interior 206 of an embodiment of a network device 2200 forming part of a network 210. The network device 2200 may comprise a plurality of components supported by a printed circuit board 209 disposed therein. For instance, the embodiment of the network device 2200 shown comprises a microcontroller 211 and an internal memory unit 212 capable of obtaining and storing one or more acceptable inputs and/or input parameters. The network device 2200 may also comprise a communication device 213, such as a radio frequency transceiver, for transmitting one or more acceptable inputs to a remote input receptor (not shown) after a user begins to enter one or more user codes. In the current embodiment, the communication device 213 communicates at a sub-1 GHz radio frequency, but in other embodiments, a communications device may be used to communicate at a variety of electromagnetic frequencies, including those used for communicating over internet, satellite, telephone, Bluetooth, Zigbee, and Z-wave applications. The communication device 213 may also receive an actuation switch from the remote input receptor after the user has supplied one or more user codes and those user codes have been found to be acceptable. When the network device 2200 receives an actuation signal from a remote input receptor, the network device 2200 may send a command over the network 210 to at least one actionable device to perform an operation.

In various embodiments, an actionable device may comprise an access control device, such as an electromechanical door lock, a garage door motor, or another access restricting mechanism. Actuation of the access control device may comprise an opening of a door or an engagement or disengagement of a lock. In these embodiments, a user may gain access to a secure area by supplying inputs to a remote input receptor that match one or more acceptable inputs. In other embodiments, an actionable device may comprise a thermostat, a television, an automated window, automated blinds, a ventilation system, a sprinkler system, a lighting element, an indoor positioning system, or other such devices known in the art.

Figure 3B:
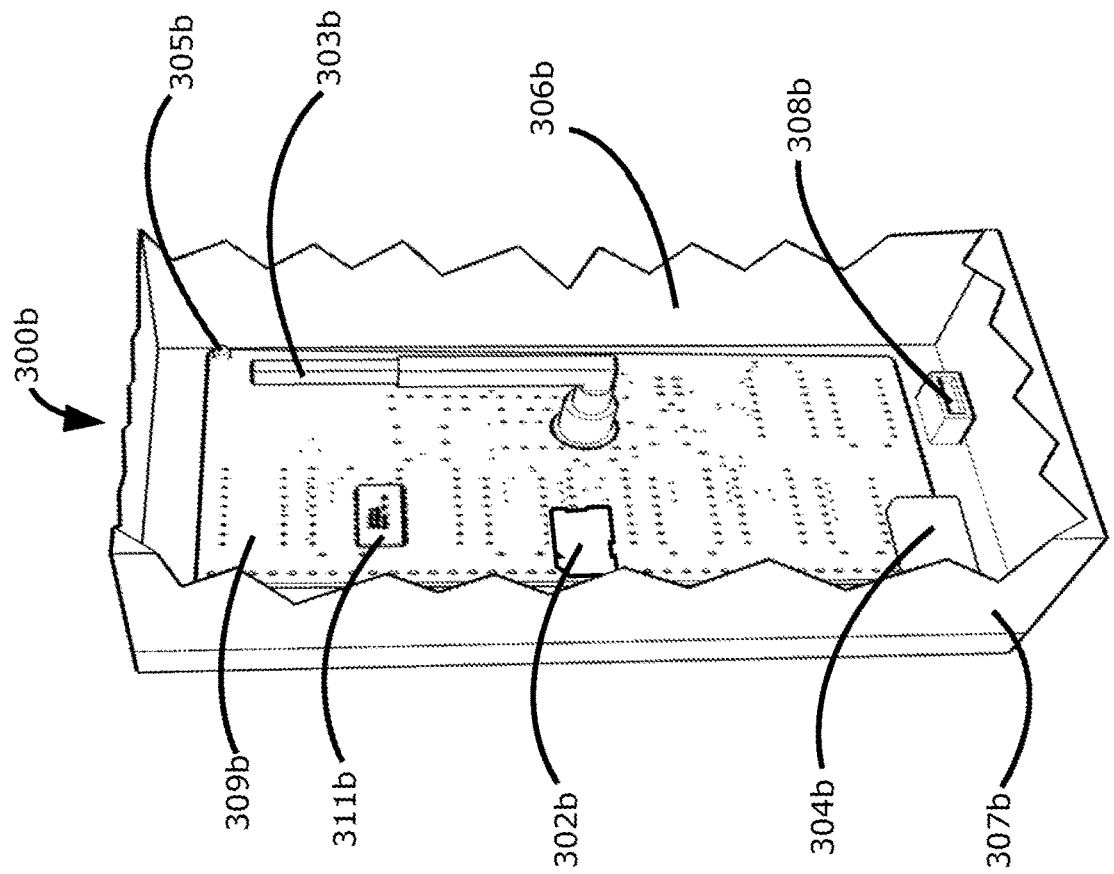
FIG. 3b is a partially cutaway perspective view of an interior of the remote input receptor shown in FIG. 3a comprising a plurality of components supported by a printed circuit board disposed therein.
Figure 3A:
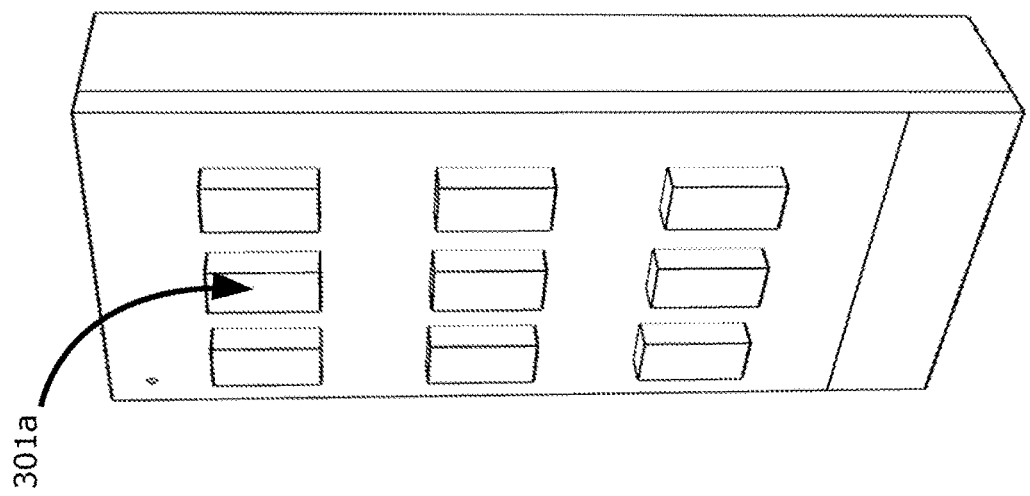
FIG. 3a is a perspective view of an embodiment of a remote input receptor.

FIGS. 3a and 3b show a perspective view and a partially-cutaway perspective view, respectively, of an embodiment of a remote input receptor 300b comprising an interface 301a and an interior 306b with a plurality of components supported by a printed circuit board 309b disposed therein.

The printed circuit board 309b may support a microcontroller 311b, an internal memory unit 302b, and a communication device 303b. A user may begin using the remote input receptor 300b by supplying a user code to the interface 301a. After this occurs, the microcontroller 311b may obtain a list of acceptable inputs from a network (not shown) via the communication device 303b and store them in the internal memory unit 302b. After a user has supplied one or more user codes to the interface 301a, the microcontroller 311b may compare the user code to the acceptable inputs. If the user code corresponds to one or more of the acceptable inputs, then the remote input receptor 300b may transmit an actuation signal to the network.

The communication device 303b may comprise a radio frequency transceiver or other known communication apparatus. Such a radio frequency transceiver may be a universal device such that it is capable of communicating with a plurality of other devices, such as by reciprocating various radio frequency transmissions. Such a radio frequency transceiver may also communicate at a sub-1 GHz frequency. It may be appreciated by those of ordinary skill in the art that communications at sub-1 GHz frequencies may be more capable of propagating through environmental obstacles, such as a plurality of walls in a residential home, than communications at frequencies higher than 1 GHz. It may therefore be desirable for said communication device 303b to transmit signals at a sub-1 GHz frequency. In some applications, however, it may be desirable to communicate at other frequencies to achieve compatibility with other devices, such as those that communicate using ZigBee, Z-Wave, Bluetooth, or Wi-Fi. Satellite terminals or cables, such as fiber optic cables, may also be used to connect to a network.

The remote input receptor 300b may be powered by a portable power source 304b, such as one or more galvanic or voltaic batteries, one or more solar cells, or other known means of portable power. The remote input receptor 300b may execute a low power function after a user has submitted a user code to the user interface 301 a. Such a low power function may be executed for a predetermined amount of time or until a user starts to use the user interface 301a again. When the low power function is executed, the remote input receptor 300b may cut power from unneeded subsystems and reduce power in others until reactivated. This low power function, combined with not requiring continuous intermittent communication with the network, may enable the portable power source 304b of the remote input receptor 300b to last significantly longer than portable power sources of other known remote actuation systems.

The remote input receptor 300b may further comprise one or more surveillance devices 305b, such as a security camera, a microphone, a proximity sensor, or other known surveillance means. For example, a security camera may be disposed within the interior 306b of the remote input receptor 300b, with a lens of the camera extending through an exterior 307b of the remote input receptor 300b. The one or more security devices 305b may continuously gather and transmit information from an environment to a network (as shown in FIG. 1). Additionally, the one or more surveillance devices 305b may trigger the remote input receptor 300b to exit the low power function when the one or more surveillance devices 305b detect a user.

The remote input receptor 300b may comprise one or more data connection ports 308b for interacting with firmware of the remote input receptor 300b, such as altering or updating the firmware, running system diagnostics, or managing acceptable inputs and/or input parameters. In some embodiments, such firmware functions may also be performed via a network. The one or more data connection ports 308b may be disposed on the interior 306b of the remote input receptor 300b to aid in preventing undesired access or accumulation of debris from the surrounding environment. The one or more data connection ports 308b may be able to be accessed by detaching a portion of the exterior 307b of the remote input receptor 300b.

FIG. 4a shows an embodiment of a remote input receptor 400a, a network 410a, and a user 420a. The remote input receptor 400a may comprise a user interface 401 a for receiving one or more user codes from the user 420a. The user interface 401 a shown comprises one or more buttons 402a. Such user interfaces may also comprise a visual display, one or more capacitive sensors, a microphone, a vibration recognition module, a proximity sensor, a fingerprint scanner, a retina scanner, a voice recognition module, or other known interfacing means.

FIG. 4b shows an embodiment of a user 420b entering one or more user codes into a remote input receptor 400b by pressing at least one button 402b on a user interface 401b. When the user 420b begins to use the user interface 401b, the remote input receptor 400b may receive a permission signal 430b from a network 410b comprising at least one or more acceptable inputs.

FIG. 4c shows an embodiment of a user 420c after entering one or more user codes into a user interface 401c by pressing at least one button 402c. At this point, a remote input receptor 400c may send an actuation signal 440c to a network 410c. The actuation signal 440c may direct the network 410c to perform some operation.

FIG. 5 shows an embodiment of an enclosed area 550 comprising an access barrier 560, such as a door, for blocking or allowing access to the enclosed area 550. The access barrier 560 may comprise an actionable device 570, such as a door lock or a garage door motor, for permitting or denying access to the enclosed area 550. The actionable device 570 may be operably connected to a network 510, wherein the network 510 may be capable of actuating the actionable device 570.

A remote input receptor 500 capable of receiving one or more user codes may be disposed in, near, or on an exterior 551 of the enclosed area 550. The remote input receptor 500 may be operably connected to the network 510 via a wireless connection 530. As a user begins supplying a user code to the remote input receptor 500, the network 510 may send a list of acceptable inputs to the remote input receptor 500 over the wireless connection 530. If the user code is found to be acceptable at the remote input receptor 500, such as being one of the acceptable inputs received, the remote input receptor 500 may send an actuation signal to the network 510 over the wireless connection 530 indicating that the network should perform a given operation, such as opening or closing the access barrier 560, or engaging or disengaging a door lock.

The network 510 may comprise one or more electronic devices 5100. In the embodiment shown, the one or more electronic devices 5100 comprises a smartphone. However, other embodiments may comprise a laptop or desktop computer, a tablet, or other devices capable of communicating over such a network. The one or more electronic devices 5100 may comprise a software application for management of the network 510, including creating, deleting, or editing one or more acceptable inputs.

Additionally, the software application may be used to create, delete, or edit one or more input parameters. Such input parameters may be used to determine one or more conditions upon which an actuation system may operate. For example, input parameters may include a time window during which the remote input receptor 500 may send an actuation signal to the network 510, a limitation on which one or more user codes may be supplied to gain access to the secure area 550, or a limitation on how many times one or more user codes may be used for sending an actuation signal to the network 510.

Whereas the present invention has been described in particular relation to the drawings attached hereto, it should be understood that other and further modifications apart from those shown or suggested herein, may be made within the scope and spirit of the present invention.

Figure 6:
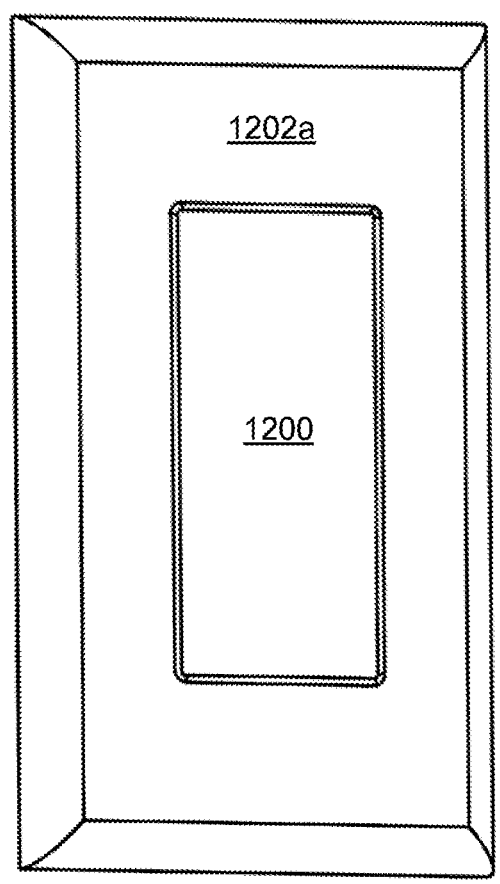
FIG. 6 is a front view of a communication tilt plate.

FIG. 6 shows a top view of one embodiment of communication tilt plate 1200 mounted in a standard rocker light switch cover 1202a. The center switch portion is a communication tilt plate device 1200 with an integrated solar cell facing outward and electronics and switch features hidden on the backside of the communication tilt plate. The external dimensions are designed such that it allows for integration of a standard rocker-type switch cover 1202a that is attached directly to a surface such as a wall with no alteration or holes other than the face plate mounting holes. The communication tilt plate may be attached to a wall or surface by covering the communication tilt plate with the wall plate and attaching the wall plate to the wall or surface. In certain cases, a communication tilt plate 1200 may be added to a current wall-mounted electrical switch location by adding the communication tilt plate 1200 device to one side and changing to a dual gang or larger panel cover and mounting the communication tilt plate device 1200 or devices in the additional opening(s).

Figure 7A:
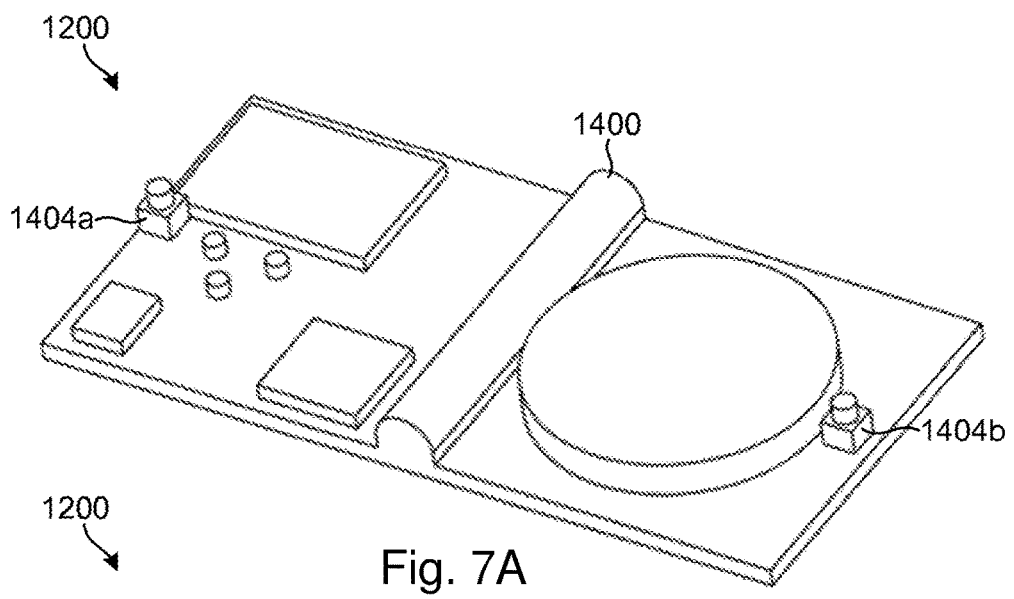
FIGS. 7A-7C are schematic views of the back side of the communication tilt plate.
Figure 7B:
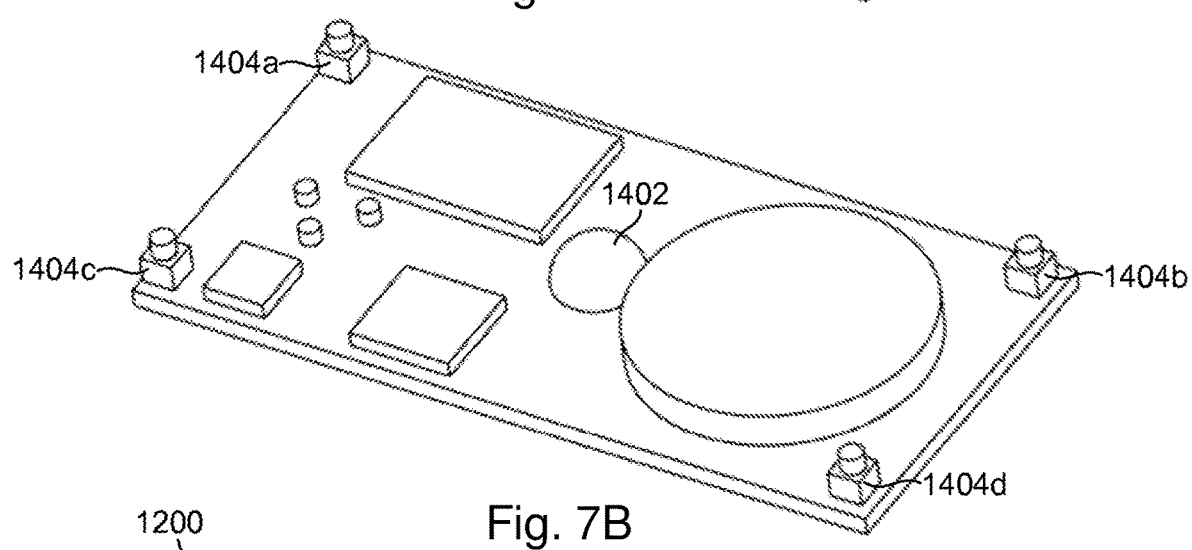
Figure 7C:
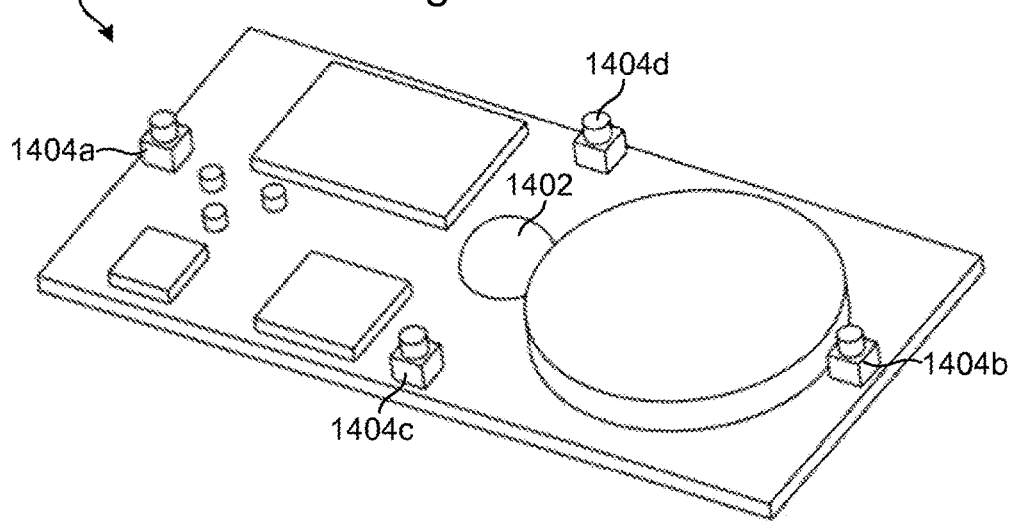

FIGS. 7A-7C show various embodiments of the back side of the touch surface of a communication tilt plate device 1200, which is held against a wall by a wall plate 1202. The back side may comprise spring-loaded switches and other electronics mounted on the back side of the touch surface. FIG. 7A shows one embodiment of a communication tilt plate device 1200 that pivots along a center ridge 1400 held against a wall. FIGS. 7B and 7C show embodiments of a communication tilt plate device 1200 that pivot around a partial spherical feature 1402 held against a wall.

In the embodiment of FIG. 7A, pressing either end of the device will actuate a switch 1404a, 1404b on the respective end. The switch 1404a, 1404b may be spring loaded with an elastic material to cause it to return a neutral position after being pressed. This type of input operation will work with one, two, three, four or more switches 1404 arranged along the periphery in appropriate locations around a fulcrum type of feature. FIG. 7B shows a configuration having switches 1404a-d in the corners and a partial sphere feature 1402 that allows the device to pivot around its center. Pressing a corner will actuate the switch 1404 under the corner. Pressing an edge will actuate two corner switches 1404 simultaneously, enabling additional types of inputs or selections. FIG. 7C shows a configuration having switches 1404a-d located on the edges of the device 1200. Pressing an edge will actuate the switch 1404 under the edge. Pressing a corner will actuate two edge switches 1404 simultaneously, enabling additional types of inputs or selections. Pressing certain points on the periphery of the touch plate in a desired sequence will transmit user codes as acceptable inputs to match acceptable inputs stored in a cloud-based network.

The communication tilt plate devices 1200 shown in FIGS. 7A through 7C may be used as the touch surface of a button located on a remote input receptor, either in stationary or mobile applications, as shown in FIGS. 4A-4C. The ability to use the communication tilt plate 1200 as an input device allows the communication tilt plate to be used in a wide variety of different applications. For example, the user codes from the communication tilt plate may be used to control a wide variety of different devices. In one contemplated embodiment, the communication tilt plate device enables a large number of different devices (e.g., window blinds or groups of window blinds, lights, fans, heating systems, cooling systems, sprinkler systems etc.) to be controlled without requiring separate controls for each device or system. For example, using the directional switches 1404 illustrated in FIG. 7C, actuating the switches 1404 on the sides of the device 1200 may be used to select a device or system to control, whereas actuating the top and bottom switches 1404 may be used to adjust an amount associated with the device or system. Specifically, actuating the switches 1404 on the sides of the device 1200 enables a user to select a current function for the communication tilt plate device 1200. A set of visual indicators (e.g., colored LEDs, LEDs with accompanying pictures or icons, etc.) may optionally be provided to indicate the current function of the communication tilt plate device 1200. Actuating the switches 1404 on the top/bottom of the device 1200 enables the user to increase or decrease an amount associated with the current function.

The communication tilt plate may be employed as a user interface of a remote input receptor. The communication tilt plate may comprise a front side and a back side, the front side comprising an outer touch surface and the back side comprising spring-loaded switches and other electronic components mounted thereon and the back side further comprising a raised center pivot and the spring loaded switches mounted thereon disposed around the periphery of the back side of the tilt plate such that by tilting the communication tilt plate by pressing proximate the periphery of the outer touch surface two or more of the spring-loaded switches mounted on the back side of the tilt plate are activated to transmit the one or more user codes to a cloud-based network and/or a local area network. The tilt plate may comprise a microcontroller for obtaining and comparing one or more acceptable inputs to one or more user codes. The tilt plate may further comprise a web application for receiving the one or more acceptable inputs and the user codes for a user, wherein the web application is in electronic communication with the microcontroller and wherein the web application communicates information pertaining to recent user interactions with the secure remote actuation system to the user through the remote input receptor. The microcontroller may obtain the one or more acceptable inputs from the cloud-based network and/or local area network after the user begins to use the interface.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A secure remote actuation system, comprising:
   a network storing one or more acceptable inputs;
   a central signal switch disposed inside an enclosure, wherein the central signal switch stores therein the one or more acceptable inputs and user codes comprising a succession of the acceptable inputs;
   a remote input receptor comprising:
     a user interface comprising a communication tilt plate comprising a front side and a back side, the front side comprising an outer touch surface and the back side comprising electronic components mounted thereon and the back side further comprising a raised center pivot and a plurality of spring loaded switches mounted thereon disposed around the periphery of the back side of the tilt plate such that by tilting the communication tilt plate by pressing proximate the periphery of the outer touch surface two or more of the spring-loaded switches mounted on the back side of the tilt plate are activated to transmit the one or more user codes;
   a microcontroller for obtaining and comparing said one or more acceptable inputs to said one or more user codes; and
   a web application for receiving the one or more acceptable inputs and the user codes for a user, wherein the web application is in electronic communication with the microcontroller and wherein the web application communicates information pertaining to recent user interactions with the secure remote actuation system to the user through the remote input receptor;
   wherein the microcontroller obtains the one or more acceptable inputs from the network after the user begins to use the interface.

2. The secure remote actuation system of claim 1, wherein the input receptor further comprises an internal memory unit for storing at least one of the one or more acceptable inputs, the one or more user codes, a history of the user codes and one or more input parameters.

3. The secure remote actuation system of claim 1, wherein the remote input receptor further comprises one or more communication devices for receiving said one or more acceptable inputs.

4. The secure remote actuation system of claim 3, wherein said one or more communication devices is a radio frequency transceiver configured to simultaneously send and receive communications.

5. The secure remote actuation system of claim 4, wherein the radio frequency transceiver is a universal device capable of communicating with a plurality of other devices by reciprocating various radio frequency transmissions, the radio frequency transceiver communicating at sub-1 GHz frequency.

6. The secure remote actuation system of claim 1, wherein the remote input receptor further comprises a portable power source.

7. The secure remote actuation system of claim 1, wherein the remote input receptor executes a low power function, so that the portable power source operably provides a low level of power to the remote input receptor, after said one or more acceptable inputs is compared to said one or more user codes, and exits said low power function when the user begins to use the user interface.

8. The secure remote actuation system of claim 1, wherein the remote input receptor further comprises a surveillance device to detect the user.

9. The secure remote actuation system of claim 8, wherein the surveillance device comprises a camera, a microphone, a proximity sensor, or a combination thereof.

10. The secure remote actuation system of claim 8, wherein the remote input receptor executes a low power function after said one or more acceptable inputs is compared to said one or more user inputs and exits said low power function when the surveillance device detects a user.

11. The secure remote actuation system of claim 1, wherein the user interface comprises buttons, a visual display, one or more capacitive sensors, a microphone, a vibration recognition module, a proximity sensor, a fingerprint scanner, a retina scanner, a voice recognition module, or a combination thereof.

12. The secure remote actuation system of claim 1, wherein the remote input receptor comprises one or more data connection ports.

13. The secure remote actuation system of claim 12, wherein the one or more data connection ports is disposed in an interior of the remote input receptor.

14. The secure remote actuation system of claim 1, wherein the network is a cloud-based network and comprises a combination of computer systems interconnected by telecommunications equipment or cables allowing information to be exchanged.

15. The secure remote actuation system of claim 14, wherein said cloud-based network comprises a software application to control said one or more acceptable inputs.

16. The secure remote actuation system of claim 1, wherein the network is a cloud-based network and comprises a network device comprising a radio frequency transceiver.

17. The secure remote actuation system of claim 16, wherein the radio frequency transceiver is a universal device capable of communicating with a plurality of other devices by reciprocating various radio frequency transmissions.

18. The secure remote actuation system of claim 16, wherein the network device comprises one or more memory units for storing said at least one of one or more acceptable inputs, a history of acceptable inputs and one or more input parameters.

19. The secure remote actuation system of claim 1, wherein the network is a cloud-based network that is operably connected to and controls one or more actionable devices.

20. The secure remote actuation system of claim 19, wherein said one or more actionable devices is a sprinkler system.

* * * * *